Aug. 6, 1946.  A. M. WOLF  2,405,250
VEHICLE SUSPENSION CONTROL MECHANISM
Original Filed June 19, 1939
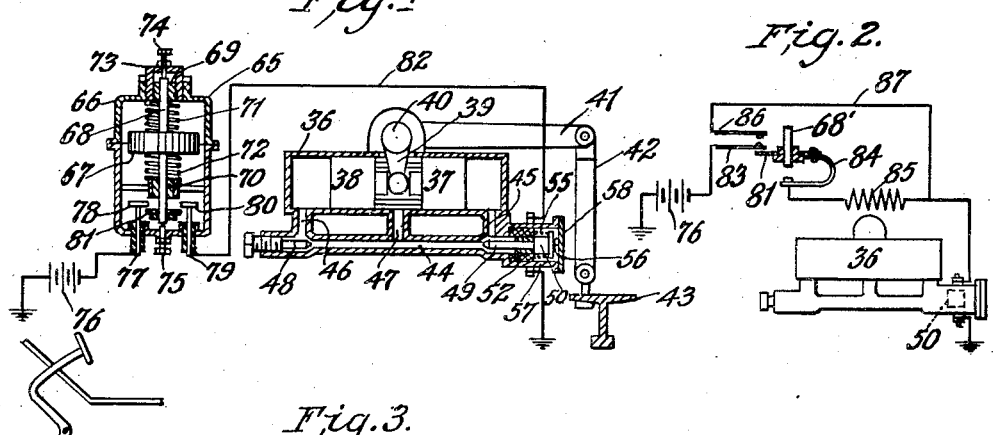
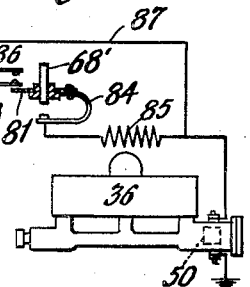
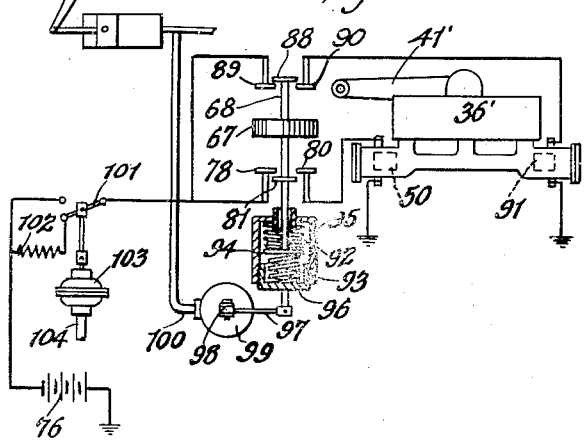
INVENTOR.
Austin M. Wolf,
BY M. C. Lyddane
ATTORNEY.

Patented Aug. 6, 1946

2,405,250

UNITED STATES PATENT OFFICE 2,405,250

VEHICLE SUSPENSION CONTROL MECHANISM

Austin M. Wolf, Plainfield, N. J.

Original application June 19, 1939, Serial No. 279,887. Divided and this application May 16, 1942, Serial No. 443,235

10 Claims. (Cl. 188—88)

This invention relates to vehicle suspension control mechanism and constitutes a division of my application Ser. No. 279,887, filed June 19, 1939, now Patent No. 2,358,371, issued September 19, 1944, which in turn is a division of my parent application Ser. No. 666,332 filed April 15, 1933, now Patent No. 2,181,161, issued November 28, 1939.

In said patent and application I have described and claimed a co-ordinated vehicle braking and suspension system, whereby, as the vehicle brakes are applied, in response to braking torque reaction, the rigidity of the suspension system is automatically modified. Thus the reaction of the suspension system to the forces of inertia tending to cause the vehicle body to dive or "nose down" upon brake application is properly controlled to nullify such tendency and thus materially increase riding comfort and eliminate the potential danger which exists at such times due to difficulty in steering.

It is a particular object of the present invention to provide means, operatively responsive independently of the braking system, to relative displacement between the vehicle body and wheels, for actuating the resistance control means of a hydraulic shock absorber.

Another object of the invention is to variably adjust the resistance control means of the shock absorber and render the same differentially effective for normal vehicle operation and in the deceleration of the vehicle.

A further object of the invention is to automatically control and regulate the shock absorber resistance in response to both compression and rebound displacement between the vehicle frame and wheels.

With the above and other objects in view, the invention consists in the improved vehicle suspension control mechanism and in the form, construction and relative arrangement of its several parts, as will hereinafter be more fully described, illustrated in the accompanying drawing, and subsequently incorporated in the subjoined claims.

In the drawing, wherein I have illustrated several simple and practical embodiments of my present invention and in which similar reference characters designate corresponding parts throughout the several views:

Fig. 1 is a semi-diagrammatic view with certain parts shown in section and illustrating one embodiment of my improved control mechanism as applied to one conventional type of vehicle shock absorber.

Fig. 2 is a diagrammatic view showing a slight modification of the electrical control circuit.

Fig. 3 is a view similar to Fig. 1, illustrating another embodiment of the invention as applied to a shock absorber having both compression and rebound resistance regulating means.

Referring now to Fig. 1 of the drawing, I have shown a well known type of hydraulic shock absorber which includes a cylinder or casing 36 in which complementary piston members 37 and 38 respectively are interconnected with a lever arm 39 on one end of a rock shaft 40. An arm 41 is rigidly connected at one of its ends to the other end of the shaft 40, the other end of said arm being connected by link 42 with the vehicle axle 43. It will be understood that the pistons 37 and 38 may be provided with the customary relief valves (not shown).

The shock absorber casing 36 is provided with a longitudinal passageway 44 communicating at its opposite ends, as at 45 and 46 respectively, with the spaces between the respective pistons 37 and 38 and the ends of the cylinder or casing 36. The passageway 44 is also centrally connected, as at 47, with the space between the pistons 37 and 38. The cylinder 36 as well as the passage 44 and its connections with said cylinder is completely filled with the shock absorber fluid or liquid.

In a shock absorber of the above type each piston 37 and 38 in its reciprocatory movement performs a single function. Upon an upward thrust of the arm 41, due to compression of the body supporting springs, the piston unit is moved to the right from its illustrated position and forces the fluid under pressure through the passages 45, 44, and 47, thus controlling the compression action of the springs. In movement of the piston unit resulting from rebound of the springs, in which arm 41 moves downwardly and the piston unit is reciprocated to the left, the fluid in the left end of cylinder 36 is transferred through passageways 46, 44 and 47 to the space between the pistons 37 and 38. Piston 38 therefore controls the rebound action. The permissible rate of flow of the shock absorber fluid is controlled by the adjustable valve member 48 which restricts the flow of fluid between cylinder 36 and passageway 44 through the connecting passage 46.

In the operation of motor vehicles at high speeds the application of the brakes or irregularities in the road surface will cause a severe reaction on the suspension system resulting in sudden and severe compression of the body supporting springs. In the operation of present day motor vehicles, upon severe brake application, the diving or "nosing down" of the front end of the vehicle body is an unavoidable consequence. In order to counteract and control excessive spring compression, due to sudden deceleration or road irregularities, I proposed to modify the responsive action of the shock absorbers and thereby stiffen up or increase the rigidity of the suspension system.

To the above end, in Fig. 1 of the drawing, I have shown one embodiment of an electrically controlled mechanism for opening and closing the connecting passage between cylinder 36 and passageway 44, and thereby governing the resistance of the shock absorber to relative movement between the vehicle body and frame. While various forms of resistance control valves might be employed in the present instance I have shown a needle valve 49 having a solenoid core 50 at one end. This needle valve is set so as to provide a normal restriction of fluid flow at the compression end of the cylinder 36. A spring 55 acts to yieldingly hold the valve in such normal position with the core 50 in contact with a suitable stop 56 on the cap plate 58 which closes the outer end of a suitable casing or housing 57 in which the solenoid and needle valve are operatively mounted.

The valve control unit includes a suitable casing 66 in which an inertia responsive mass 67 is fixed to a vertical rod or stem 68 intermediate of its ends. This rod, at its upper and lower ends, is guided in the graphite bushings 69 and 70 respectively. The inertia mass 67 is supported in a floating position within the casing 66 by the upper and lower springs 71 and 72 respectively. The springs may be properly set and their reaction predetermined in accordance with the weight of the mass 67 by means of the adjustable cap 73 threaded in the upper end of the casing 66 and coacting with spring 71. The upper and lower adjustable set screws 74 and 75 respectively, limit the vertical travel of the mass 67 in each direction.

The battery 76 is connected with an adjustable rod 77 mounted in the lower end wall of the casing 66 and having a contact head 78 on its upper end. This contact is located at one side of the rod 68 and at the opposite side thereof a similar vertical rod 79 is mounted in the housing wall and provided with contact head 80 on its upper end. Below, and bridging the space between the contact heads 78 and 80, a circuit closing disk 81 is mounted on the rod 68 and suitably insulated therefrom. The rod 79 is connected by wire 82 with the coil of solenoid 50 of the resistance control valve of the shock absorber.

Assuming that the shock absorber connects the front vehicle axle and frame, it will be evident, from the above description, that upon a sudden downward movement of the vehicle frame, due to vehicle deceleration or road irregularity, the inertia mass 67 will move upwardly and disk 81 will be caused to contact with the heads 78 and 80 of the rods 77 and 79 respectively. An electric circuit for the solenoid 50 is thus closed to adjust the control valve for the hydraulic fluid and increase the resistance of the shock absorber to relative displacement between the vehicle frame and wheels. It will be appreciated that a similar mechanism may be provided to take care of sudden engine torque application, in order to prevent the elevation of the front end of the vehicle frame and the depression of the rear end thereof, by utilizing such an inertia responsive control unit for the rear shock absorbers.

In order to provide for a somewhat closer control of the fluid flow regulating valve of the shock absorber, I may provide a two-stage control, as indicated in Fig. 2. In this case a greater amplitude of vertical movement of the rod 68' is permitted and when the circuit closing disk 81', carried by said rod, first contacts the resiliently yieldable member 83, current flows from battery 76 through said member and disk and flexible cable 84, attached at one end to said disk. From the other stationary end of this cable the current flows to the solenoid coil through the resistance 85. This will produce a certain initial movement of the needle valve, dependent upon the value of the resistance 85 and the opposing resistance of spring 55 to movement of the solenoid, as seen in Fig. 1. By short circuiting the resistance 85 a further movement of the needle valve towards its closed position is obtained. This results from a continued upward movement of rod 68' which deflects the spring member 83 into contact with a similar opposing spring member 86 connected by shunt wire 87 around the resistance 85 to the solenoid coil.

In Fig. 3 of the drawing I have shown an electrical system of control as applied to another type of shock absorber 36', which is provided with the usual operating arm 41' connected with the vehicle axle in the manner above described. The weight or inertia mass 67 and rod 68 are also employed, but in this case, in addition to the circuit closing disk 81 and contacts 78 and 80, I provide a circuit closing disk 88 on the upper end of rod 68 to engage the spaced contacts 89 and 90 which may be mounted in the upper end wall of casing 66 in a similar manner to the contact heads 78 and 80, as shown in Fig. 1.

In this construction, in addition to the needle valve operated by the solenoid 50 in the compression end of the shock absorber, I also provide a similar needle valve operated by a second solenoid 91 at the rebound end of the shock absorber. It will be evident that when the lower disk 81 engages contacts 78 and 80 solenoid 50 is energized so that at the compression end of the shock absorber the needle valve will be moved to increasingly restrict the flow of the shock absorber fluid. The upper contact 90 is connected with the coil of solenoid 91. Therefore, it will be seen, that when the upper disk 88 engages contacts 89 and 90, solenoid 91 will be energized to operate the needle valve at the rebound end of the shock absorber to produce greater resistance to flow of the shock absorber fluid.

When the vehicle wheels strike an obstruction the body supporting springs are compressed and the frame moves upwardly. The inertia of rest of weight 67 causes it to remain stationary against the action of its supporting spring so that the disk 88 engages the contacts 89 and 90. With the point of view focused upon the vehicle frame the movement of the weight 67 is downward to cause such contact. As the body supporting springs are in the compressed state and are about to rebound, the added resistance at the rebound end of the shock absorber retards such action and snubs the intensity of the rebound. When the chassis springs have straightened out to normal condition, most of the rebound energy stored in the springs has been snubbed out so that the frame and body of the vehicle begin to drop. This results in the closing of the circuit between disk 81 and contacts 78 and 80 so that solenoid 50 at the compression end of the shock absorber is energized. In this way the proper shock absorber resistance is produced so that each phase of the compression and rebound action of the body supporting springs is anticipated and properly snubbed. Of course, such a system will also offer the proper shock absorber resistance to relative movement between the vehicle frame and wheels during the braking torque reaction.

In order to properly differentiate the sensitiveness of response of the inertia mass 67, as between the conditions prevailing during normal driving of the vehicle and during braking, springs 92 and 93 are arranged respectively above and below a disk 94 secured to the lower end of rod 68 and within a suitable housing 95. The lower spring 93 bears against a cup member 96 threaded within the lower end of said housing. A lever 97 is connected at one of its ends with said cup member and at its other end is operatively connected, as at 98, with a piston or diaphragm within the chamber 99, to which fluid pressure is admitted through pipe 100 from a convenient source, such as the fluid operated brake applying system of the vehicle. Thus, I have shown chamber 99 connected with the brake line 105 supplied with fluid pressure from the master cylinder 106 operated by the brake pedal 107. Thus upon the admission of the pressure fluid to the cylinder or chamber 99, in greater or less volume, to actuate the piston or diaphragm, the cup member 96 is rotated and the springs 92 and 93 compressed. In this case the resistance of the springs to movement of the weight 67 is increased so that such movement will be retarded or lessened, as during braking operation, when the extent of frame movement relative to the vehicle wheels is greater than during normal driving.

As an additional means for providing more sensitive control of the shock absorber unit, which may be used either in conjunction with the device last described or independently thereof, I may employ a switch 101 in the circuit between battery 76 and contacts 78 and 89. In the position of this switch, as shown in the drawing, the current passes through the switch by way of the resistance 102, thereby reducing the intensity of current flow to the solenoids 50 and 91. The movable switch element is operatively connected to a diaphragm in chamber 103 which is supplied with pressure fluid through pipe 104. Thus when pressure is supplied to said chamber switch 101 will be moved to closed position, thereby short-circuiting the resistance 102 and increasing the intensity of the current flow. It will of course be understood that either compressed air, hydraulic liquid, or vacuum may be used for the operation of the member 96 and switch 101.

From the foregoing description the construction and manner of operation of the several disclosed embodiments of the invention may be clearly understood. It will be seen that I have provided novel suspension control mechanism which may be used with particular advantage upon motor vehicles to automatically modify the rigidity of the suspension system upon relative displacement between the vehicle frame and wheels due to application of the brakes or other causes, and increase the resistance of the shock absorbers so that the influence of the forces of inertia tending to cause the front end of the vehicle body to dive or "nose down" will be effectively nullified.

Although I have described several practical embodiments of my present invention, it is apparent that the principles involved are susceptible of incorporation in various other structural forms. Accordingly, it is to be understood that the drawing and description are largely illustrative, and that the privilege is reserved of incorporating the several novel features of the present disclosure in such other alternative exemplifications thereof as may fairly be comprehended within the spirit and scope of the appended claims.

I claim:

1. In combination with a fluid shock absorber for road vehicles having a resistance control valve, electrical means for actuating said valve to increase the resistance of the shock absorber to relative displacement between the vehicle body and wheels, an inertia device responsive to such displacement for energizing said electrical means, and means variably regulating the degree of energization of said electrical means by said inertia device.

2. In combination with a fluid shock absorber for road vehicles having a resistance control valve, electrical means for actuating said valve to increase the resistance of the shock absorber to relative displacement between the vehicle body and wheels, an inertia device responsive to such displacement for energizing said electrical means, and fluid pressure actuated means variably controlling the responsive action of said inertia device.

3. In combination with a fluid shock absorber for road vehicles having a resistance control valve, an inertia device responsive to relative displacement between the vehicle body and wheels, fluid pressure actuated means for variably controlling the responsive action of said inertia device in relation to the magnitude of such displacement, and electrical means controlled by said inertia device to actuate said resistance control valve.

4. In combination with a fluid shock absorber for road vehicles, separate compression and rebound resistance control valves therefor, and actuating means for said valves including a remotely located inertia responsive device common to both valves, and means energized by said device to actuate the same at relatively different times in the compression and rebound displacement between the vehicle body and wheels.

5. In combination with a fluid shock absorber for road vehicles, separate compression and rebound resistance control valves therefor, and actuating means for said control valves including a remotely located device common to both valves and operatively responsive to relative displacement between the vehicle body and wheels, and means energized by said device to independently actuate said valves.

6. In combination with a fluid shock absorber for road vehicles, separate compression and rebound resistance control valves therefor, and actuating means for said valves including an inertia device common to both valves and electrical operating means associated with each valve and energized at relatively different times by said inertia device to effect actuation of said valves and control compression and rebound displacement between the vehicle body and wheels.

7. In combination with a fluid shock absorber for vehicles, means for regulating resistance to flow of the shock absorbing fluid, said means including electrically energizable means, a movable member directly responsive to the electrical impulse when said means is energized and governing the flow of shock absorber fluid, means responsive to the influence of torque force developed by application of the vehicle brakes to close the circuit of said energizable means and actuate said member, and additional means directly responsive to the brake applying force for modifying the effective action of said last named means.

8. In combination with a vehicle shock absorber having resistance regulating means, actuating means for said regulating means operatively responsive to relative movement between the vehicle frame and wheels, and means operatively controlled by the vehicle brake applying force and co-operating with said actuating means to render said resistance regulating means differentially effective during normal vehicle operation and in the operation of the vehicle braking system.

9. In combination with a vehicle shock absorber having resistance regulating means, actuating means for said regulating means including an inertia device, and means responsively influenced by the vehicle brake applying force to control the action of said inertia device and render said resistance regulating means differentially effective during normal vehicle operation and in the operation of the vehicle braking system.

10. In combination with a fluid shock absorber for road vehicles having separate compression and rebound resistance control valves, electrical means directly associated with and actuating the respective valves, and inertia responsive means operable in the compression and rebound displacement between the vehicle frame and wheels to selectively energize the respective electrical means and independently operate the corresponding resistance control valve.

AUSTIN M. WOLF.